United States Patent [19]
Komiya

[11] Patent Number: 5,629,916
[45] Date of Patent: May 13, 1997

[54] OPTICAL INFORMATION REPRODUCING DEVICE FORMING LIGHT SPOT ON PHOTO-DETECTOR WITH MAJOR AXIS ALONG PUSH-PULL SIGNAL DETECTION

[75] Inventor: Masaaki Komiya, Akigawa, Japan

[73] Assignee: Olympic Optical Co., Ltd., Tokyo, Japan

[21] Appl. No.: 453,361

[22] Filed: May 30, 1995

[30] Foreign Application Priority Data

Jun. 1, 1994 [JP] Japan ..................................... 6-120069

[51] Int. Cl.$^6$ ..................................................... B11B 7/09
[52] U.S. Cl. ..................... 369/110; 369/112; 369/44.14; 369/109; 369/44.23; 369/44.41
[58] Field of Search ........................ 369/112, 44.14, 369/109, 44.23, 103, 110, 275.1, 44.11, 44.12, 44.41

[56] References Cited

U.S. PATENT DOCUMENTS

| | | | |
|---|---|---|---|
| 5,113,386 | 5/1992 | Whitehead et al. | 369/44.41 |
| 5,483,509 | 1/1996 | Yang et al. | 369/110 |
| 5,488,598 | 1/1996 | Endo et al. | 369/120 |

FOREIGN PATENT DOCUMENTS

| | | |
|---|---|---|
| 1-211345A | 8/1989 | Japan . |
| 1-227230A | 9/1989 | Japan . |
| 2-185750A | 7/1990 | Japan . |
| 6-131692A | 5/1994 | Japan . |

Primary Examiner—Georgia Y. Epps
Assistant Examiner—Kim-Kwok Chu
Attorney, Agent, or Firm—Watson Cole Stevens Davis, P.L.L.C.

[57] ABSTRACT

An optical information reproducing device for reading informations recorded on the opto-magnetic recording medium is disclosed. The device comprises a first beam splitter for separating an inward path from an outward path of the light and a second beam splitter having a plane-parallel plate for separating the separated return light into two light fluxes including light flux with at least astigmatism, the first beam splitter having transmittivity and reflectance factor for the polarization component in the direction perpendicular to the linear polarization direction of the incident light being about 100%, the photodetector for receiving light flux with astigmatism separated from the second beam splitter being arranged in such a manner that the major axis of the ellipsoidal spot formed on the photodetector due to astigmatism becomes the push-pull signal direction.

17 Claims, 9 Drawing Sheets

FIG_1

FIG_5

FIG_6

FIG_7

FIG_8

FIG_12a
PRIOR ART

FIG_12b
PRIOR ART

↕ Push-pull signal direction

OPTICAL INFORMATION REPRODUCING DEVICE FORMING LIGHT SPOT ON PHOTO-DETECTOR WITH MAJOR AXIS ALONG PUSH-PULL SIGNAL DETECTION

BACKGROUND OF THE INVENTION

1. Field of the Invention

The present invention relates to an optical information reproducing device for reading informations recorded on an opto-magnetic recording medium.

2. Related Art Statement

Figure 9:
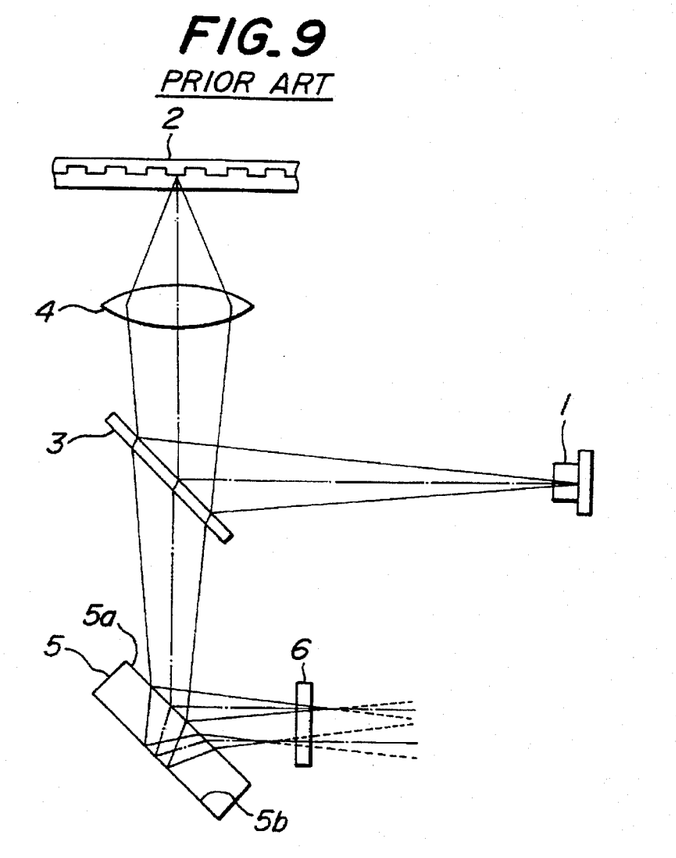
FIG. 9 is an explanatory view showing one example of a conventional optical information reproducing device.

Such an optical information reproducing device is disclosed in, for example, Japanese Patent Application Opened No. 227,230/89, and is shown as a conventional example in FIG. 9 of the present invention. In the first conventional device, the diverging beam from a laser diode 1 is incident on a beam splitter 3, the beam reflected by the beam splitter 3 is converged by an objective lens 4 and illuminated on a disk 2. The return beam reflected by the disk 2 is incident on the beam splitter 3 through the objective lens 4 to separate the light transmitted through the beam splitter from an outward path of the light, the return light transmitted through the beam splitter 3 is incident on a plane-parallel plate 5, and the return light (first light beam) reflected on a surface 5a of the plate 5 and the return light (second light beam) refracted and transmitted through the surface 5a and reflected on an inner surface 5b of the plate 5 and further refracted and transmitted through the surface 5a are received on a photodetector 6.

Figure 10:
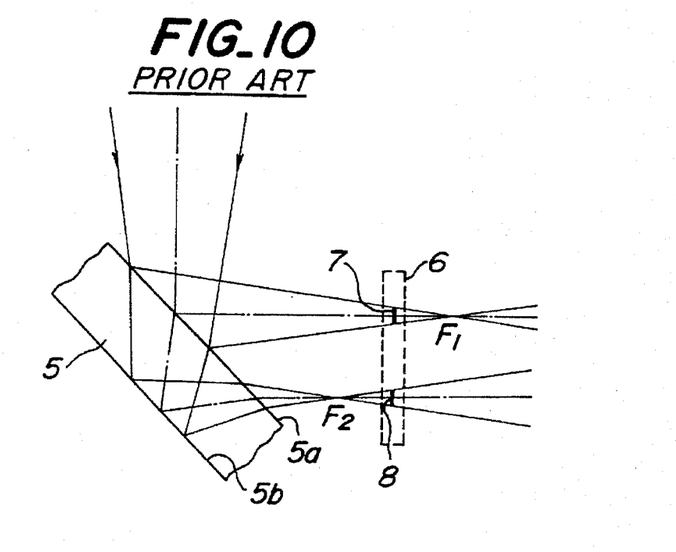
FIG. 10 is a detailed view showing the part of the device shown in FIG. 9.

The plane-parallel plate 5 is so constructed that light quantity of the first light beam is equal to that of the second light beam. As shown in FIG. 10, the photodetector 6 comprises a first light receiving element 7 for receiving the first light beam and a second light receiving element 8 for receiving the second light beam and is disposed at substantially a center between a focus F1 of the first light beam and a focus F2 of the second light beam in such a manner that when the objective lens 4 is in a focusing condition to the disk 2, the first light receiving element 7 is disposed in front of a focal plane of the first light beam and the first light receiving element 8 is disposed behind a focal plane of the second light beam. In this case, a light receiving surface of each of the respective light receiving elements is formed in accordance with a sectional area of the corresponding light flux in such a manner that light outputs of the first and second light receiving elements 7, 8 are equal to each other. In this way, the focusing control is performed on the basis of the difference between the light outputs of the first and the second light receiving elements in the first conventional example.

Figure 11:
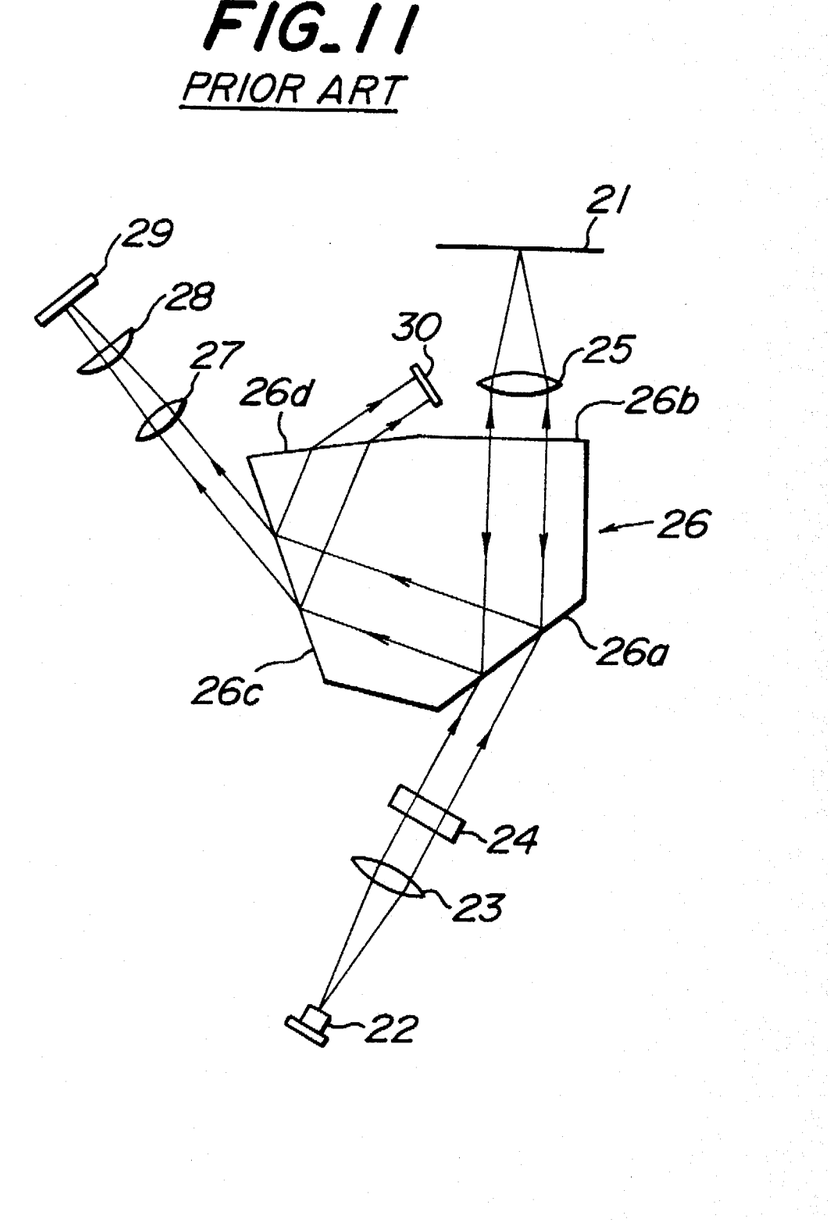
FIG. 11 is an explanatory view showing another example of a conventional optical information reproducing device.

Also, a second conventional optical information reproducing device is disclosed in, for example, Japanese Patent Application Opened No. 185,750/90, and is shown as a conventional example in FIG. 11 of the present invention. In this second conventional example, the diverging beam from a laser diode 22 is made a collimated beam by passing through a collimator lens 23, and then is incident on a first surface 26a of a square column prism 26 through a half-wave plate 24. The beam refracted and transmitted through the first surface 26a and emitted from a second surface 26b is converged by an objective lens 25 and then illuminated on an opto-magnetic disk 21. The return light reflected from the opto-magnetic disk 21 is incident on the second surface 26b through the objective lens 25 and reflected on the first surface 26a in the prism 26 and then led to a third surface 26c therein. The return beam refracted and transmitted through the third surface 26c of the prism 26 is received on a first photodetector 29 having light receiving region divided by four through a condenser lens 27 and a circular column lens 28, while the return light reflected on the third surface 26c and refracted and transmitted through a fourth surface 26d of the prism 26 is received on a second photodetector 30 having light receiving region divided by two.

In this case, the first surface 26a of the prism 26 is formed as a half-mirror surface having a function by which the beam having an ellipsoidal cross-section emanated from the laser diode 22 is shaped to a beam having a circular cross-section. The third surface 26c of the prism 26 is formed as a surface of polarization beam splitter by a dielectric multilayer coating having about 100% of p polarization transmittivity and about 100% of s polarization reflectivity. The fourth surface 26d of the prism 26 is formed as a polarization beam splitter surface having about 100% of s polarization transmittivity. As described above, in the second conventional example, the information reproduced signal is detected on the basis of the difference between the sum output of the light receiving regions divided by four of the first photodetector 29 and the sum output of the light receiving regions divided by two of the second photodetector 30, the focusing error signal is detected on the basis of the difference of the sum output of the opposite angle regions of the light receiving region divided by four of the first photodetector 29, and the tracking error signal is detected on the basis of the output difference of the light receiving regions divided by two of the second photodetector 30.

Figure 12A:
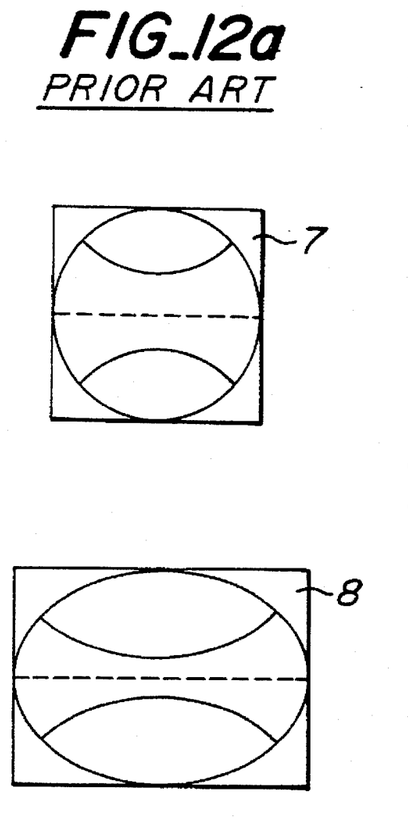
FIGS. 12a–12b are an explanatory view showing the problem point of the device shown in FIG. 9.

As shown in FIG. 12a, in the construction shown in the first conventional example, the circular spot of a beam is formed on the first light receiving element 7 and the ellipsoidal spot of the beam is formed on the second light receiving element 8 because of having astigmatism caused by passing the second beam through the plane-parallel plate 5, so that respective spots include push-pull signal components. As shown in FIG. 12a, therefore, if at least one of the first and second light receiving elements 7, 8 (both elements 7, 8 in FIG. 10a) is constructed by the light receiving region divided by two in the direction of the push-pull signal, the tracking error signal can be detected by the push-pull system on the basis of the output difference of the light receiving region divided by two.

Figure 12B:
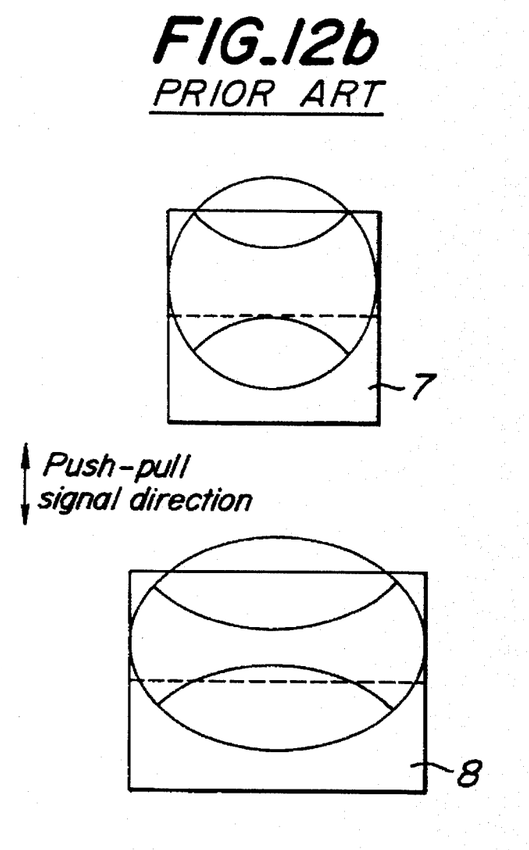

In this first conventional example, however, the device is so constructed that the minor axis direction of the spot having the ellipsoidal cross-section of the second light beam having astigmatism is equal to the push-pull signal direction, so that if the optical component such as laser diode 1 or the other is inclined by the change or so of the outer circumstance and the optical axis is shifted in the direction of the push-pull signal, as shown in FIG. 10b, the push-pull signal is liable to subject to an offset in the second light receiving element, and thus the tracking error signal can not be detected precisely. Moreover, the light receiving surface of the first and second light receiving element is formed in accordance with the cross-section of the corresponding light flux, so that respective light spot is liable to shift from the corresponding light receiving element due to the shift of the optical axis, and thus the modulation ratio of the push-pull signal is decreased and when the information signal is detected with sum of light quantity, C/N of the information signal becomes deteriorated too.

In the construction shown in the second conventional example, moreover, the first surface 26a of the prism 26 is made as a half-mirror surface, so that in case of reflecting the return light on the first surface 26a, a half of the light including the information signal component has been transmitted and thus the C/N of the information signal becomes deteriorated by 6 dB.

SUMMARY OF THE INVENTION

It is an object of the present invention to resolve the above described problems of the conventional optical information reproducing device.

It is another object of the present invention to provide an optical information reproducing device capable of preventing the C/N of the information signal from being deteriorated effectively and capable of decreasing the push-pull signal from being offset effectively.

According to the present invention, there is provided an optical information reproducing device comprising a semiconductor laser, an opto-magnetic recording medium for recording optical informations thereon, an optical system provided between the semiconductor laser and the opto-magnetic recording medium and including a first beam splitter for separating an outward path from an inward path of the light and having about 100% of transmittivity and reflectance factor for polarization components in the direction perpendicular to a linear polarization direction of an incident light, and an optical detecting means comprising a second beam splitter of about plano-parallel plate shape disposed to incline to its optical axis and for receiving a return light reflected from the first beam splitter to separate it into two light fluxes including a flux with at least astigmatism, said optical detecting means being arranged in such a manner that the major axis of the ellipsoidal spot formed on the photodetector due to astigmatism becomes the push-pull signal direction, thereby detecting push-pull signal based on the output of the optical detecting means receiving the light flux having astigmatism.

In case of detecting the focusing error signal by a beam sizing method, in a preferable embodiment of the device according to the present invention, the optical detecting means comprises a first light detector for receiving one of two light fluxes separated by the second beam splitter and disposed in front of or behind an imaging point of the light flux in the focusing state of the objective lens for the opto-magnetic recording medium, and a second light detector for receiving the other of two light fluxes separated by the second beam splitter and disposed in rear or in front of the imaging point of the light flux in the focusing state, and at least one of these photodetectors is constructed by dividing the light receiving region into three in the direction orthogonal to the direction of push-pull signal in order to detect the focusing error signal.

In case of constructing a separating type optical system, in a preferable embodiment of the device according to the present invention, a collimator lens is disposed between the semiconductor laser and the first beam splitter, and a condenser lens and a ½ wave plate are disposed between the first beam splitter and the second beam splitter.

In a preferable embodiment of the device according to the present invention, the light flux from the semiconductor laser reflected on the first beam splitter is received on a light quantity monitoring photodetector, thereby controlling the quantity of emanated light from the semiconductor laser based on the output of the light quantity monitoring photodetector.

According to the present invention, the first beam splitter has a transmittivity or a reflectance factor of 100% for the polarization component orthogonal to the linear polarization direction of the incident light emanated from the semiconductor laser, so that the information signal component included in the return light from the opto-magnetic recording medium is transmitted through or reflected on the first beam splitter by substantially 100%, thereby separating it from the outward path of the light, and thus preventing the C/N of the information signal from being deteriorated effectively. Moreover, the photodetector receiving the light flux having astigmatism is disposed in such a manner that the major axis direction of the ellipsoidal spot formed on the photodetector due to astigmatism is made the direction of push-pull signal, so that even if the optical axis is shifted to the push-pull signal direction, the offset of the push-pull signal can be decreased effectively as compared with the case that the push-pull signal direction is in the minor axis direction of the ellipsoidal spot.

DETAILED EXPLANATION OF THE PREFERRED EMBODIMENT

Now to the drawings, there are shown various embodiments of an optical information reproducing device according to the present invention. Like parts are shown by corresponding reference characters throughout several views of the drawings.

Figure 1:
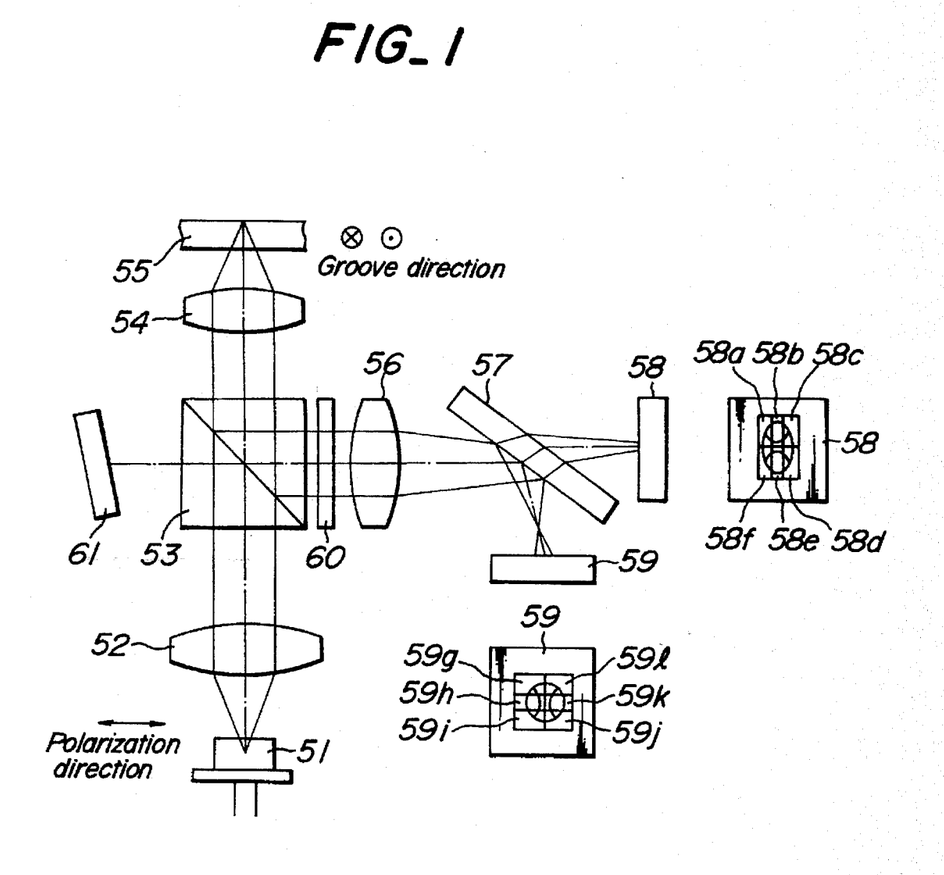
FIG. 1 is an explanatory view showing a construction of a first embodiment of an optical information reproducing device according to the present invention.

FIG. 1 shows a first embodiment of an optical information reproducing device according to the present invention. The device comprises a light source, for example a semiconductor laser 51; an optical system including a collimator lens 52, a first beam splitter 53, and an objective lens 54; an optical information recording medium, for example an opto-magnetic recording medium; and an optical detecting means including a ½ wave plate 60, a condenser lens 56, a second beam splitter 57 with a plane-parallel plate shape, and photodetectors 58, 59 for signal detection, as well as a light quantity monitoring photodetector 61. The light emitted from the semiconductor laser 51 is collimated by the collimator lens 52 to form a parallel light flux which is then incident on the first beam splitter 53. In this embodiment, the first beam splitter 53 is so constructed that its s polarization reflectance factor is about 100%, p polarization reflectance factor is about 20~50% and the phase difference between p polarization and s polarization is 0 or ±180°. The linear polarization light from the semiconductor laser 51 is incident on the first beam splitter 53 with p polarization (inner direction to the paper plane).

The light flux emitted from the semiconductor laser 51 and transmitted through the first beam splitter 53 is focused on an opto-magnetic recording medium 55 through the objective lens 54. In this embodiment, the groove direction of the opto-magnetic recording medium 55 is made a direction perpendicular to the paper plane. The light flux emitted from the semiconductor laser 51 and reflected on first beam splitter 53 is received on the photodetector 61 for light quantity monitoring, thereby controlling the emitted light quantity of the semiconductor laser 51 in accordance with the output thereof. The light quantity monitoring photodetector 61 is disposed in the inclined state to the optical axis so as to prevent the incident light from being reflected on its light receiving surface to return to the semiconductor laser 51 and the signal detecting photodetectors 58, 59.

The return light reflected on the opto-magnetic recording medium 55 is incident on the first beam splitter 53 through the objective lens 54 and reflected thereon to separate it from the outward light path. The return light separated from the outward path is focused by the condenser lens 56 through the ½ wave plate 60, and incident on the second beam splitter 57. The second beam splitter 57 separates the incident light into two light fluxes, one light flux with astigmatism refracted and transmitted therethrough, and the other light flux reflected thereon, and these light fluxes are received on the signal detecting photodetectors 58, 59, respectively.

The ½ wave plate 60 is so disposed that its azimuth is in the position of 22.5° from inner direction to the paper plane about the optical axis, thereby rotating the emitted light by 45° to the incident light. The second beam splitter 57 is constructed in such a manner that the s polarization reflectance factor is about 100% and the p polarization reflectance factor is about 0% in order to separate the incident light into two polarization components orthogonal to each other, thereby receiving the light flux (p polarization component) with astigmatism refracted and transmitted through the second beam splitter 57 on the signal detecting photodetector 58, and receiving the light flux (s polarization component) reflected on the second beam splitter 57 on the signal detecting photodetector 59.

In this embodiment, the signal detecting photodetector 58 is disposed in front of the imaging point of the condenser lens 56 in such a manner that the major axis direction of the ellipsoidal spot formed on the signal detecting photodetector 58 becomes the push-pull signal direction due to astigmatism in the focusing skate of the objective lens 54 for the opto-magnetic recording medium 55, and the signal detecting photodetector 59 is disposed behind the imaging point of the condenser lens 56 in the focusing state. As shown in FIG. 1 by plan view, the signal detecting photodetectors 58, 59 are formed so as to make respective light receiving surface larger than the size of the spot in the focusing state sufficiently, and respective light receiving surfaces are formed by light receiving regions divided by six 58a, 58b, 58c, 58d, 58e, 58f; 59g, 59h, 59i, 59j, 59k, 59l which are formed by dividing it into two in the push-pull signal direction and dividing it into three in the direction orthogonal thereto, for the corresponding light flux.

In this way, in the present embodiment, supposing that the outputs of light receiving regions divided by six 58a, 58b, 58c, 58d, 58e, 58f of the signal detecting photodetector 58 are made a, b, c, d, e, and f, and the outputs of light receiving regions divided by six 59g, 59h, 59i, 59j, 59k, 59l of the signal detecting photodetector 59 are made g, h, i, j, k and l, the focusing error signal (FE) is obtained from following equation by the beam sizing method, $$FE=\{a+c+d+f-(b+e)\}-\{g+l+i+j-(h+k)\}$$

or the tracking error signal (TE) is obtained from following equation by the push-pull system.

$$TE1=a+b+c-(d+e+f)$$

Alternatively, the tracking error signal is obtained from following equation.

$$TE2=a+b+c+j+k+l-(d+e+f+g+h+i)$$

Also, the opto-magnetic signal (RF) is obtained by the differential method as a following equation.

$$RF=a+b+c+d+e+f-(g+h+i+j+k+l)$$

Figure 2A:
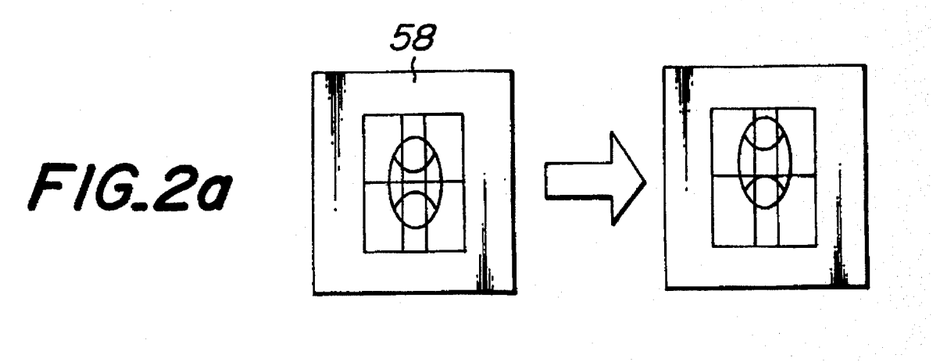
FIGS. 2a–2c are an explanatory view showing the function of the optical information reproducing device according to the present invention.
Figure 2B:
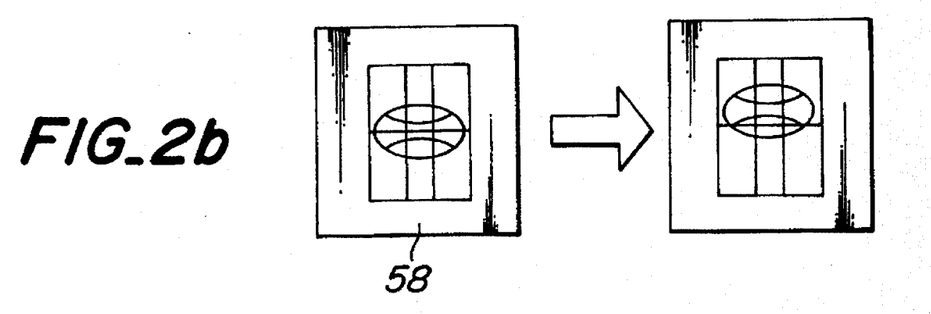

In this embodiment, hereinafter, as to the case that the semiconductor laser 51 or the other optical components are inclined by the change of the outer circumstances and the optical axis is shifted in the push-pull signal direction, the above TE1 is explained as an example. FIG. 2a shows the manner before and after movement of the spot due to the shift of the optical axis on the signal detecting photodetector 58 in the first embodiment. FIG. 2b shows the manner before and after movement of the spot due to the shift of the optical axis on the signal detecting photodetector 58 in case of making positional relation on the optical axis of the signal detecting photodetectors 58, 59 to the imaging point of the condenser lens 56 reverse.

Figure 2C:
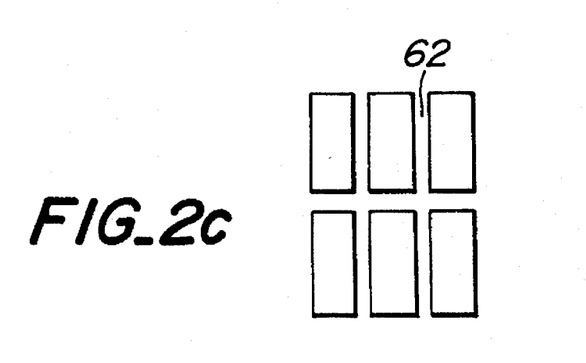

As is seen from FIGS. 2a and 2b, in the cases that the major axis direction of the ellipsoidal spot is coincident with the push-pull signal direction (FIG. 2a) and that the minor axis direction of the ellipsoidal spot is coincident with the push-pull signal direction (FIG. 2b), if the shifting amount of the optical axis is the same, the moving amount of the spot on the signal detecting photodetector 58 is the same, the offset change of the push-pull signal is reverse proportional to the size of the spot in the moving direction. As shown in FIG. 2c, the signal detecting photodetector 58 has dead zone portions 62 having a width of few μm for dividing the light receiving region, so that in the case of FIG. 2b, for the same size of the spot, the area for the sensible zone portions (light receiving region) becomes smaller than that in FIG. 2a, and thus even if the moving amount of the spot is the same, the caused offset becomes large. In this point, in this embodiment, the major axis direction of the ellipsoidal spot is coincident with the push-pull signal direction, so that the offset of the push-pull signal can be decreased.

In the case of obtaining the tracking error signal (ET2), in this embodiment, if the shift of the optical axis is caused, respective spots on the signal detecting photodetectors 58, 59 are moved in the offset canceling direction, but as in FIG. 2b, if the positional relationship on the optical axis of the signal detecting photodetectors 58, 59 is made reverse for the imaging point of the condenser lens 56, the spot moving amount on the signal detecting photodetector 58 becomes very large as compared with the spot moving amount on the signal detecting photodetector 59, so that the offset can not be canceled.

Therefore, according to this embodiment, even if the shift of the optical axis is caused by the outer circumstances or the like, the offset of the push-pull signal can be decreased effectively, and thus the stable tracking control can be performed. Also, the light receiving surface of the signal detecting photodetectors 58, 59 is made sufficiently large, so that the protrusion from the light receiving surface of the spot due to the shift of the optical axis can be prevented effectively, and thus the reduction of the modulating factor of the push-pull signal caused thereby and the degradation of C/N of the opto-magnetic signal can also be prevented.

In this embodiment, moreover, the first beam splitter 53 is formed to obtain about 100% of s polarization reflectance so that about 100% of the signal component rotated by Kerr effect in the optomagnetic recording medium 55 can be reflected toward the side of the signal detecting photodetectors 58, 59. Therefore, the signal component can be detected effectively and thus C/N of the opto-magnetic signal can be improved.

Figure 3:
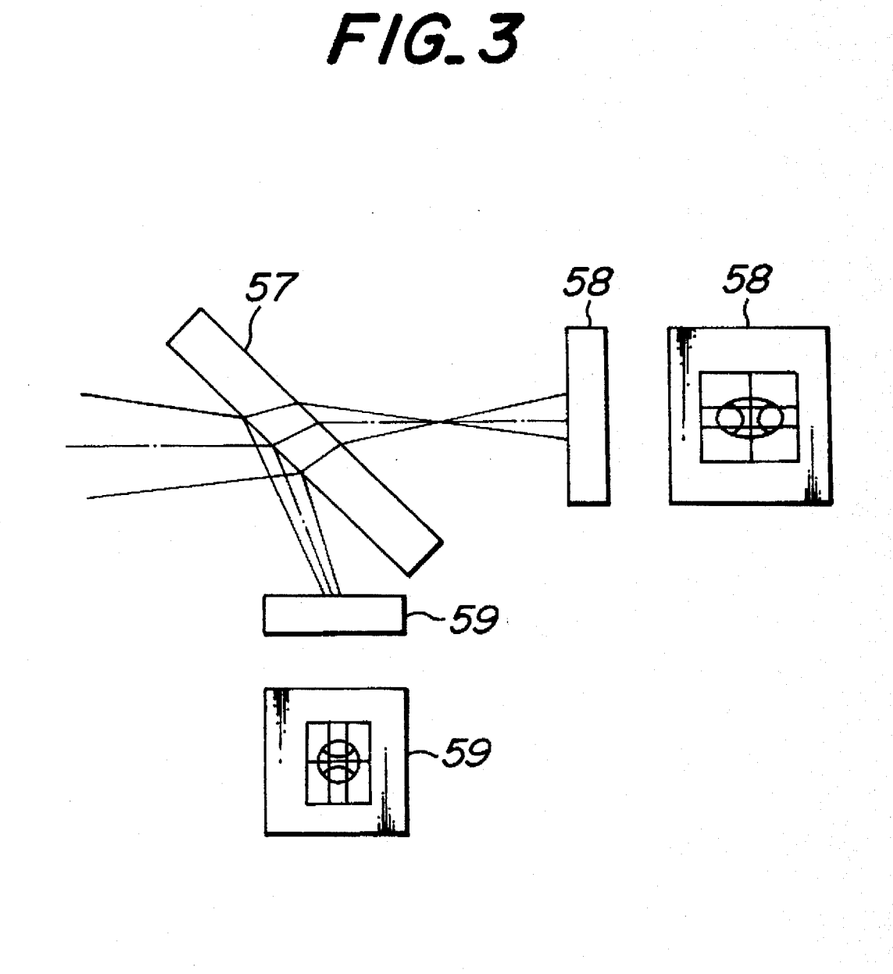
FIG. 3 is an explanatory view showing a modification of the first embodiment of the optical information reproducing device according to the present invention.

In FIG. 1, also, the groove direction of the opto-magnetic recording medium 55 is made perpendicular to the paper plane, but if the groove direction is parallel to the paper plane, as shown in FIG. 3, the positional relation on the optical axis of the signal detecting photodetectors 58, 59 for the imaging point of the condenser lens 56 is made reverse, and thus the major axis direction of the ellipsoidal spot due to astigmatism formed on the signal detecting photodetector 58 is made the direction of the push-pull signal. In this way, the same effect of the first embodiment can be obtained.

In FIG. 1, the ½ wave plate 60 is used to obtain 45° of rotation in polarization direction of the return light, but a ¼ wave plate can be used instead of the ½ wave plate 60. In this case, if the ¼ wave plate is so arranged that its azimuth is 45° about the optical axis for the inner direction of paper plane and the first beam splitter 53 is so constructed that the phase difference of p polarization and s polarization is ±90°, so that the same effect of the first embodiment can be obtained.

Figure 4:
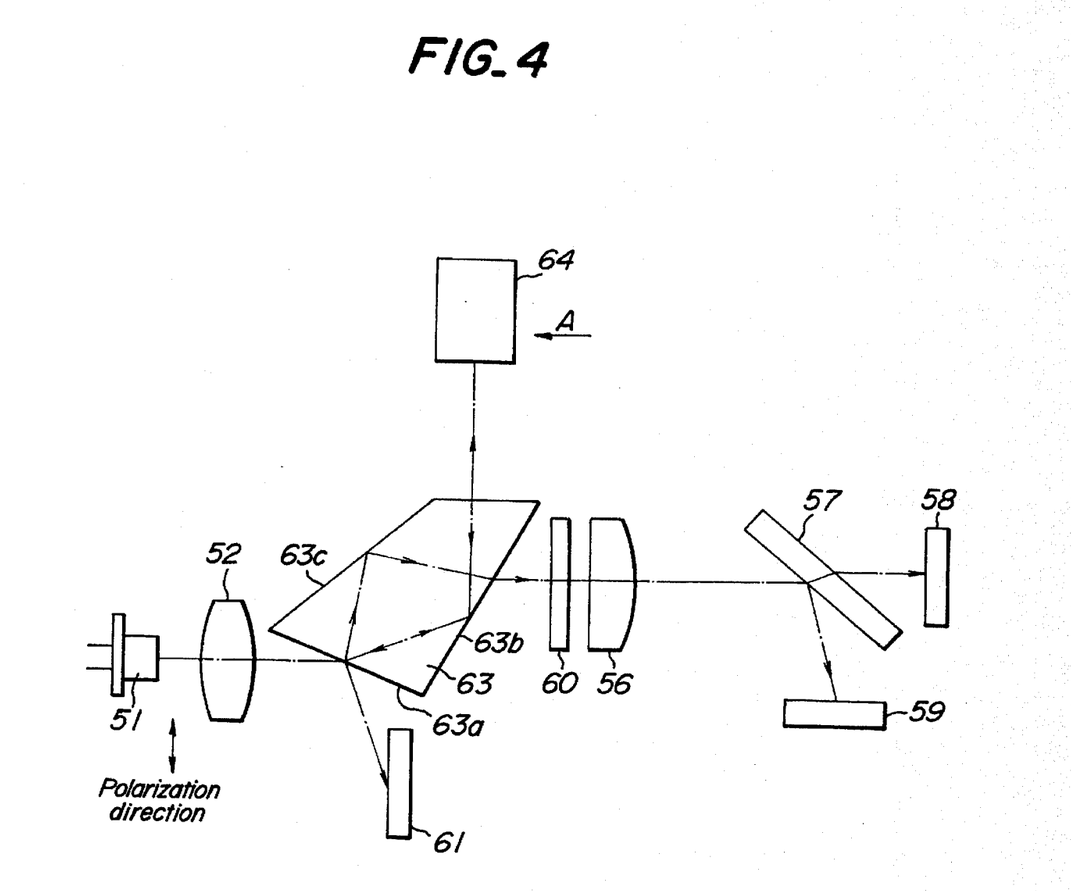
FIG. 4 is an explanatory view showing a construction of a second embodiment of an optical information reproducing device according to the present invention.
Figure 5:
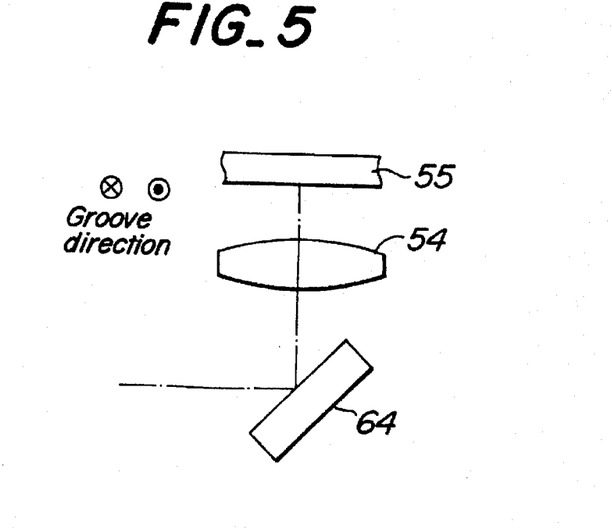
FIG. 5 is an explanatory view viewed in the direction of an arrow A shown in FIG. 4.

FIGS. 4 and 5 show a second embodiment of the optical information reproducing device according to the present invention. In this embodiment, in the construction shown in FIG. 1, a block shaped prism 63 having beam shaping function is used as the first beam splitter, and a total reflection mirror 64 is disposed between the prism 63 and the objective lens 54 and then the optical system except for the objective lens 54 is arranged in the direction about parallel to the opto-magnetic recording medium 55.

In FIG. 4, the light emitted from the semiconductor laser 51 is collimated by the collimator lens 52 and incident on a first surface 63a of the prism 63. The light transmitted through the first surface 63a is beam-shaped and total-reflected on a second surface 63b and leaves the prism 63. The light flux emitted from the semiconductor laser 51 and reflected on the first surface 63a of the prism 63 is received on the light quantity monitoring photodetector 61. The light flux emitted from the semiconductor laser 51 and leaving from the prism 63 is incident on a total reflection mirror 64 and totally reflected thereon upwardly in the direction perpendicular to the paper plane, and then focused on the opto-magnetic recording medium 55 through the objective lens 54 as shown in FIG. 5 which is a view shown in the direction of an arrow of FIG. 4. In this embodiment, the groove direction of the opto-magnetic recording medium 55 is in the direction perpendicular to the paper plane in the partial side view of FIG. 4.

The return light reflected on the opto-magnetic recording medium 55 is totally reflected on the total reflection mirror 64 through the objective lens 54 and incident on the prism 63 and then successively reflected on the second surface 63b, the first surface 63a and the third surface 63c of the prism 63 in this order, and finally transmitted through the second surface 63b, thereby separating the return beam from an outward light path.

In this case, the total reflection mirror 64 is so constructed that the reflectance factors of both p polarization and s polarization are 100%. The prism 63 is so constructed that for the return beam, the second surface 63b has 100% of s polarization and p polarization reflectance factors, the first surface 63a has 100% of s polarization reflectance factor and 20~50% of p polarization reflectance factor, and the third surface 63c has 100% of s polarization and p polarization reflectance factors. The phase difference between p polarization and s polarization is made 0°±180° as a total value from the total reflection mirror 64 to the third surface 63c for the return light beam.

The return light emerged from the second surface 63b of the prism 63 is focused by the condenser lens 56 through the ½ wave plate 60 and incident on the second beam splitter 57. The second beam splitter 57 refracts and transmits the beam incident thereon and separates it into two light flux, one being a light flux having astigmatism and the other being reflected light flux, and these light fluxes are received on the signal detecting photodetectors 58, 59, respectively. The ½ wave plate 60 is so arranged that as in the same manner as the first embodiment, its azimuth is in the position of 22.5° about the optical axis from the inner direction to the paper plane, thereby rotating the emitted light by 45° for the incident light. The second beam splitter 57 is also so constructed that s polarization is about 100% and p polarization is about 0% in order to separate the incident light into the polarization components orthogonal to each other, so that the light flux (s polarization component) having astigmatism and refracted and transmitted through the second beam splitter 57 is received on the signal detecting photodetector 58, and the light flux (s polarization) reflected on the second beam splitter 57 is received on the signal detecting photodetector 59.

The signal detecting photodetector 58 is disposed in front of the imaging point of the condenser lens 56 in such a manner that the major axis direction of the ellipsoidal spot formed on the signal detecting photodetector 58 due to astigmatism becomes the push-pull signal direction in the focusing state of the objective lens 54 for the opto-magnetic recording medium 55, and the signal detecting photodetector 59 is disposed in rear the imaging point of the condenser lens 56 in the focusing state. In the same manner as in the first embodiment, these signal detecting photodetectors 58, 59 are formed so as to make respective light receiving surfaces larger than the size of the spot in the focusing state sufficiently, and respective light receiving surfaces are formed by light receiving regions divided by six which are formed by dividing it into two in the push-pull signal direction and dividing it into three in the direction orthogonal thereto, for the corresponding light flux, so that as in the same manner as the first embodiment, the focusing error signal, tracking error signal and opto-magnetic signal can be obtained.

According to this embodiment, in addition to the effect of the first embodiment, the beam shaping is performed, so that the shape of the spot on the opto-magnetic recording medium 55 can be made substantially circular. As the first beam splitter, the block shaped prism 63 which does not have junctions between prisms is used so that the cost of the device can be made decreased. Moreover, in the case of this embodiment, the objective lens 54 and the total reflection mirror 64 are separated from the rest of the optical system to form a separated type optical system by making these portions 54 and 64 movable, so that the movable portion can be lightened and thus the optical information reproduction device suitable for high speed seeking can be realized.

In this embodiment, also, as in the same manner as the explanation in the first embodiment, if the groove direction of the opto-magnetic recording medium 55 is parallel to the paper plane, the positional relation on the optical axis of the signal detecting photodetectors 58, 59 for the imaging point of the condenser lens 56 is made reverse, and thus the major axis of the ellipsoidal spot due to astigmatism formed on the signal detecting photodetector 58 becomes a push-pull signal direction. In this way, the same effect as the first embodiment can be obtained. The ¼ wave plate in used instead of ½ wave plate 60 to set its azimuth at the position of 45° about the optical axis for the inner direction to the paper plane, and the phase difference between the p polarization and s polarization in the light path of the return light from the total reflection mirror 64 to the third surface 63b, from which the return light of the prism 63 is emanated, becomes ±90° in total. In this way, the same effect as the previous embodiment can be obtained.

Figure 6:
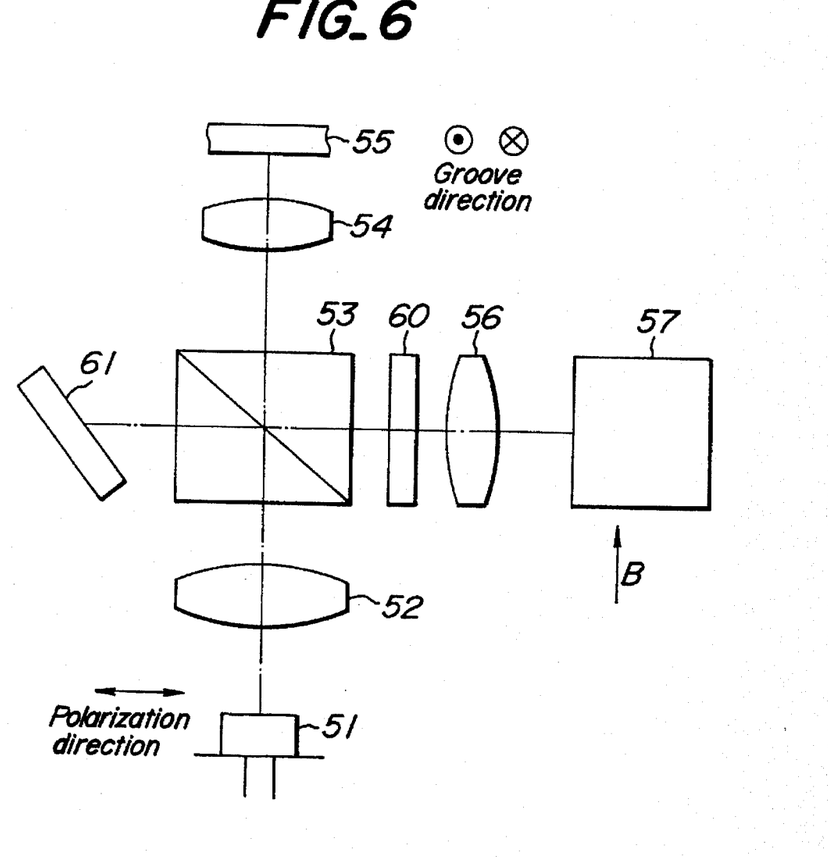
FIG. 6 is an explanatory view showing a construction of a third embodiment of an optical information reproducing device according to the present invention.
Figure 7:
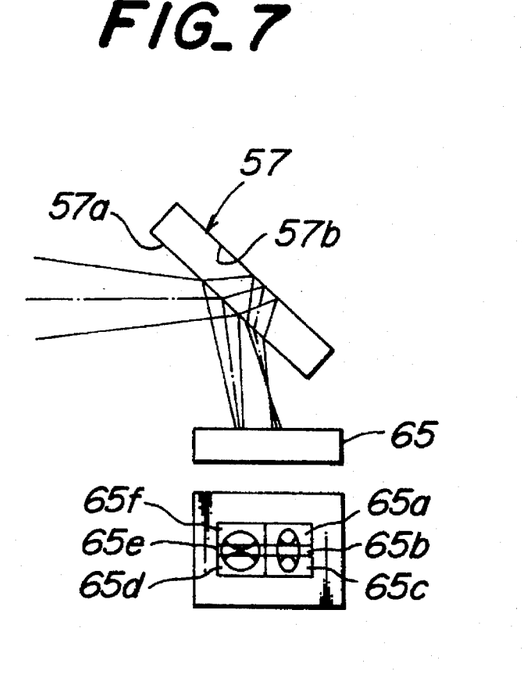
FIG. 7 is an explanatory view viewed in the direction of an arrow B shown in FIG. 6.

FIGS. 6 and 7 show a third embodiment of the optical information reproducing device according to the present invention. This embodiment is so constructed that in the construction shown in FIG. 1, the second beam splitter 57 is arranged by rotating it by 90° about the light axis, thereby separating the return light from the opto-magnetic recording medium 55 into two light fluxes, one being a light flux reflected on the surface 57a of the splitter 57 and the other being a light flux refracted and transmitted through the surface 57a and reflected on the surface 57b as well as again refracted and transmitted through the surface 57a and having astigmatism. The photodetector for receiving the two light fluxes separated by the second beam splitter 57, respectively, is constructed as a signal detecting photodetector 65, having light receiving regions divided by six which are formed by dividing it into two in the push-pull signal direction and dividing it into three in the direction orthogonal thereto, and chipping, three light receiving regions 65a, 65b and 65c of region divided by two are used as an photodetector for one receiving one light flux having astigmatism, and the other three light receiving regions 65d, 65e and 65f are used as a photodetector for receiving the other light flux. This signal detecting photodetector 65 is arranged in such a manner that the major axis of the ellipsoidal spot of the flux having astigmatism formed on the light receiving regions 65a, 65b and 65c becomes the push-pull signal direction and the light receiving regions 65a, 65b and 65c are disposed in rear the imaging point of the condenser lens 56 and the light receiving regions 65d, 65e and 65f are disposed in front of the imaging point of the condenser lens 56.

In this way, in the present embodiment, supposing that the outputs of light receiving regions divided by six 65a, 65b, 65c, 65d, 65e, 65f of the signal detecting photodetector 65 are made a, b, c, d, e, and f, respectively, the focusing error signal (FE) is obtained from following equation by the beam sizing method, $FE=(a+c-b)-(d+f-e)$ or the tracking error signal (TE) is obtained from following equation by the push-pull system.

$TE1=a-c$

Alternatively, the tracking error signal TE2 is obtained from following equation.

$TE2=a+d-(c+f)$

Also, the opto-magnetic signal (RF) is obtained by the differential method from a following equation.

$RF=a+b+c-(d+e+f)$

According to the present embodiment, in addition to the effect of the first embodiment, the photodetector receiving two light fluxes separated by the second beam splitter 57, respectively, is constructed by one signal detecting photodetector 65 having the light receiving region divided by six and subjected to chipping, so that the positional adjusting of the optical image reproducing device can be made easy within short time and with low cost.

Figure 8:
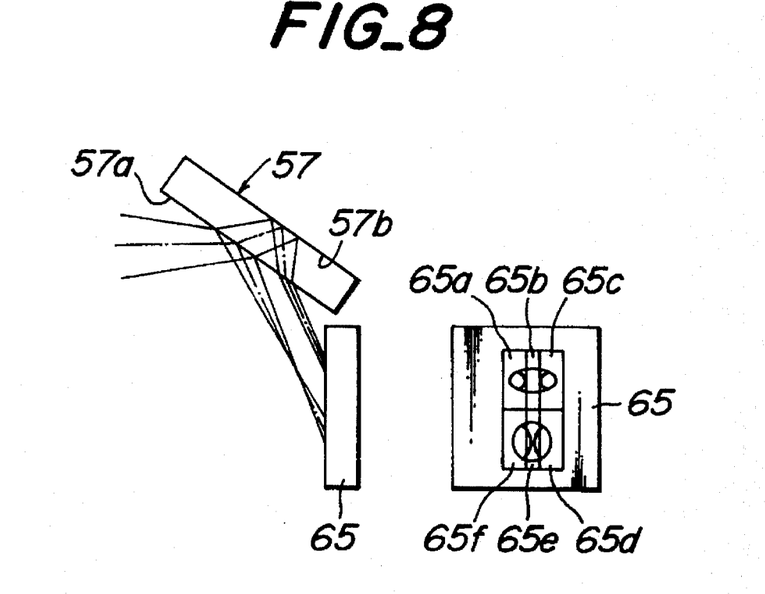
FIG. 8 is an explanatory view showing a modification of the third embodiment of the optical information reproducing device according to the present invention.

In this embodiment, also, the groove direction of the opto-magnetic recording medium 55 is made perpendicular to the paper plane, but if the groove direction is parallel to the paper plane, as shown in FIG. 8, the positional relation on the optical axis of the light receiving regions 65a, 65b and 65c and the light receiving regions 65d, 65e and 65f of the signal detecting photodetector 65 for the imaging point of the condenser lens 56 is made reverse, and thus the major axis direction of the ellipsoidal spot due to astigmatism formed on the light receiving regions 65a, 65b and 65c is made the direction of the push-pull signal. In this way, the same effect of the previous embodiment can be obtained.

The present invention is not limited to the above described embodiments, but various change or alternation can be performed. For example, in the above embodiments, the light flux from the semiconductor is transmitted through the first beam splitter to lead the opto-magnetic recording medium, but this light flux is reflected on the first beam splitter to lead the opto-magnetic recording medium. In this case, in the above explanation, the descriptions of the reflection and the transmission for the first beam splitter may be exchanged and the characteristics of the p polarization and s polarization are also exchanged, and thus the light flux from the semiconductor laser may be incident on the first beam splitter.

In the above described embodiment, moreover, the optical system is used as an infinite optical system using the collimator lens, but the optical system may be constructed as a finite optical system without using the collimator lens. In this case, the condenser lens may be omitted.

As described above, according to the present invention, in the first beam splitter for separating the inward path from the outward path of the light, the transmittivity and the reflectance factor for the polarization component in the direction perpendicular to the linear polarization direction of the incident light are made about 100%, so that the information signal components including in the return light emanated from the opto-magnetic recording medium may be made transmitted and reflected by about 100% to separate them from the outward path of the light, and thus the C/N of the information signal can be prevented from being degraded, effectively. Moreover, the photodetector receiving the return light having astigmatism separated by the second beam splitter is so arranged that the major axis of the ellipsoidal spot formed on the photodetector due to astigmatism becomes the push-pull signal direction, so that even if the optical axis is shifted in the push-pull signal direction, the offset of the push-pull signal can be decreased effectively, as compared with the case that the push-pull signal direction is in the minor axis direction.

What is claimed is:

1. An optical information reproducing device comprising:

a light source for generating incident light having a first linear polarization direction, an information recording medium for recording information thereon, an optical system provided between the light source and the information recording medium and including one beam splitter for separating a path of the incident light from a path of return light reflected by the information recording medium and having about 100% transmittivity or reflectance for a polarization component of the return light which has a second linear polarization direction perpendicular to said first linear polarization direction, and optical detecting means, comprising a photodetector for receiving the light reflected by the information recording medium, for producing from the return light a first light flux with astigmatism and for making the light flux incident on the photodetector in such a manner that a major axis of an ellipsoidal spot formed on the photodetector due to the astigmatism lies along a push-pull signal direction.

2. An optical information reproducing device as claimed in claim 1, wherein the beam splitter has a reflectance of about 100% for s-polarized light and of 20–50% for p-polarized light.

3. An optical information reproducing device as claimed in claim 1, wherein the light source is a semiconductor laser.

4. An optical information reproducing device as claimed in claim 3, wherein the optical system further comprises a collimator lens for collimating the incident light emanated from the light source and an objective lens for focusing the incident light on the recording medium.

5. An optical information reproducing device as claimed in claim 3, wherein the optical detecting means further comprises a ½ wave plate or a ¼ wave plate for changing polarization states of the return light, a condenser lens for converging the return light, a second beam splitter for separating the return light into said first light flux and a second light flux with polarization directions orthogonal to each other, and a second photodetector for receiving the second light flux to generate an output.

6. An optical information reproducing device as claimed in claim 5, wherein the second beam splitter comprises a plane-parallel plate polarizing beam splitter which transmits the light flux, while imparting the astigmatism to the light flux, and reflects the second light flux.

7. An optical information reproducing device as claimed in claim 1, wherein the information recording medium is an opto-magnetic recording medium.

8. An optical information reproducing device as claimed in claim 7, wherein the optical system further comprises a collimator lens for collimating the incident light emanated from the light source and an objective lens for focusing the incident light on the recording medium.

9. An optical information reproducing device as claimed in claim 8, wherein the optical detecting means further comprises a ½ wave plate or a ¼ wave plate for changing polarization states of the return light, a condenser lens for converging the return light, a second beam splitter for separating the return light into said first light flux and a second light flux with polarization directions orthogonal to each other, and a second photodetector for receiving the second light flux to generate an output.

10. An optical information reproducing device comprising:

a semiconductor laser for generating incident light having a first linear polarization direction, an opto-magnetic recording medium for recording information thereon, an optical system provided between the semiconductor laser and the opto-magnetic recording medium and including a first beam splitter for separating a path of the incident light from a path of return light reflected by the medium and having about 100% transmittivity or reflectance for a polarization component of the return light which has a second linear polarization direction perpendicular to said first linear polarization direction, and an optical detecting means comprising a photodetector and a second beam splitter of about plane-parallel plate shape disposed to incline to an optical axis of the return light as the return light is incident on the second beam splitter and for receiving the return light to separate the return light into two light fluxes including a first light flux with astigmatism and a second light flux with no astigmatism, said optical detecting means being arranged in such a manner that a major axis of an ellipsoidal spot formed on the photodetector due to the astigmatism lies along a push-pull signal direction, thereby detecting a push-pull signal based on an output of the photodetector.

11. An optical information reproducing device as claimed in claim 10, wherein the photodetector is disposed in front of or in rear of an imaging point of the first light flux when the objective lens is focused and the optical detecting means further comprises a second photodetector for receiving the second light flux and disposed behind or in front of an imaging point of the second light flux when the objective lens is focused, and at least one of the photodetector and the second photodetector is constructed by dividing a light receiving region into three portions in the direction orthogonal to the push-pull signal direction in order to detect a focusing error signal.

12. An optical information reproducing device as claimed in claim 11, further comprising a collimator lens disposed between the semiconductor laser and the first beam splitter and a ½ wave plate or ¼ wave plate and a condenser lens disposed between the first beam splitter and the second beam splitter.

13. An optical information reproducing device as claimed in claim 11, wherein a portion of the incident light reflected by the first beam splitter is received on a light quantity monitoring photodetector, thereby controlling a quantity of the incident light from the semiconductor laser based on an output of the light quantity monitoring photodetector.

14. An optical information reproducing device as claimed in claim 10, further comprising a collimator lens disposed between the semiconductor laser and the first beam splitter and a ½ wave plate or ¼ wave plate and a condenser lens disposed between the first beam splitter and the second beam splitter.

15. An optical information reproducing device as claimed in claim 10, wherein the first beam splitter has a reflectance of about 100% for s-polarized light and of 20–50% for p-polarized light.

16. An optical information reproducing device as claimed in claim 10, wherein a portion of the incident light reflected by the first beam splitter is received on a light quantity monitoring photodetector, thereby controlling a quantity of the incident light from the semiconductor laser based on an output of the light quantity monitoring photodetector.

17. An optical information reproducing device as claimed in claim 10, wherein:

the first and second light fluxes have orthogonal polarization directions; and the second beam splitter transmits the first light flux, while imparting the astigmatism to the first light flux, and reflects the second light flux.

* * * * *